March 20, 1962 P. NARBUT 3,026,492
INDUCTIVE APPARATUS FOR UTILIZING GASEOUS DIELECTRICS
Filed Dec. 6, 1957 5 Sheets-Sheet 1

WITNESSES:
Bernard R. Gieguey
Wm. B. Sellers

INVENTOR
Paul Narbut
BY
F. E. Browder
ATTORNEY

March 20, 1962  P. NARBUT  3,026,492
INDUCTIVE APPARATUS FOR UTILIZING GASEOUS DIELECTRICS
Filed Dec. 6, 1957  5 Sheets-Sheet 4

United States Patent Office 3,026,492
Patented Mar. 20, 1962

3,026,492
INDUCTIVE APPARATUS FOR UTILIZING GASEOUS DIELECTRICS
Paul Narbut, Hickory Township, Mercer County, Pa., assignor to Westinghouse Electric Corporation, East Pittsburgh, Pa., a corporation of Pennsylvania
Filed Dec. 6, 1957, Ser. No. 701,217
9 Claims. (Cl. 336—70)

The invention relates generally to inductive apparatus for utilizing gaseous dielectrics and more particularly to inductive apparatus and the members employed in conjunction with the core and windings to prevent corona and flashover when enveloped in a gaseous dielectric.

The object of the invention is to provide an inductive apparatus stucture utilizing gaseous dielectrics which will offer high resistance to flashover and will have a high corona level.

It is also an object of the invention to provide for so disposing solid insulation in relation to the windings that its presence does not lower the flashover and corona values in a gaseous dielectric.

A further object of the invention is to provide members for use in conjunction with windings to be employed in an electronegative gaseous dielectric which will give high resistance to flashover when subjected to impulse voltages.

Other objects of the invention will, in part, be obvious and will, in part, appear hereinafter.

The invention accordingly comprises the features of construction, a combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

In building inductive apparatus for utilizing an electronegative gaseous dielectric and particularly a fluorine-containing gaseous dielectric, tests have revealed that solid insulating barriers between high and low voltage windings and between high and low voltage windings and ground lower the impulse voltages at which corona and flashover occur. Therefore, when a fluorine-containing gaseous dielectric is to be employed, inductive apparatus will be built without solid insulation between the high and low voltage windings and between the high and low voltage windings and ground.

Further, it has been found highly desirable to make the windings or coils and other members to present rounded or curved parts where they ordinarily presented square corners and angular or sharp edges. The parts of the windings and other members that ordinarily have square corners and sharp edges, but in this structure rounded, will be hereinafter referred to as rounded corners and edges.

Even though the coils and other members to be described hereinafter are provided with round corners and edges, it has been found that solid insulation disposed between the high and low voltage windings or between the high and low voltage windings and ground is detrimental when the coils are used in a gaseous dielectric containing fluorine. Therefore, in order to provide a coil stack or winding with high flashover values and corona resistance in transformers utilizing a fluorine-containing gaseous dielectric, the transformer should be constructed without solid insulation barriers and with coils and cores that have rounded corners and edges which will not cause a concentration of electrical stresses.

In order to disclose the objections to windings and other members with square corners and edges and the advantages of the present inductive apparatus with rounded corners and edges when operated in a gaseous dielectric, and more particularly a gaseous dielectric containing fluorine, without flashover or corona discharge when subject to predetermined impulse voltages for which it has been designed, details of tests which were made to establish certain facts will be given. The tests or investigations were made utilizing equipment simulating the members employed in building the inductive apparatus herein described and employing, in part, an electronegative gaseous dielectric under the operating conditions common in the use of inductive apparatus, such as transformers. In this specification when reference is made to an electronegative gaseous dielectric gas, gases such as sulfur hexafluoride, and the vapors of the electrically insulating fluorinated compounds such as disclosed in Patent 2,561,738, issued July 24, 1951, are particularly intended.

Figure 6:
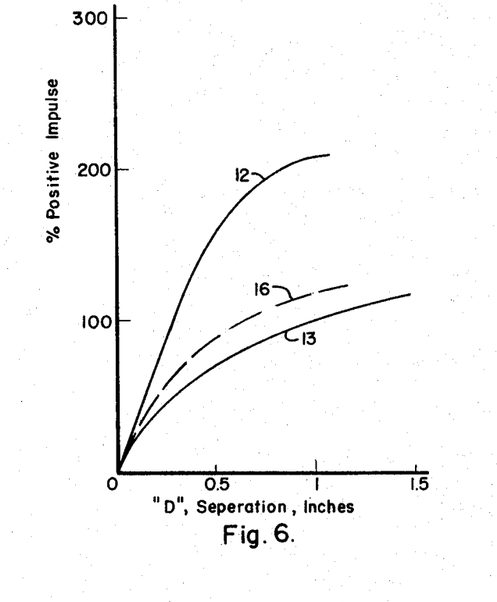
FIG. 6 is a set of graphs showing the resistance to flashover offered by inductive apparatus with and without solid insulation between the windings and between the windings and ground, when the windings of the coil stacks are provided with corners of different shapes and when solid insulation is associated therewith and the windings are subjected to impulse voltages of different magnitudes.
Figure 6A:
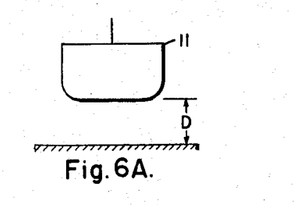
FIG. 6A is a view in side elevation of an electrode or member that offers high resistance of flashover in a fluoro-carbon vapor.
Figure 6B:
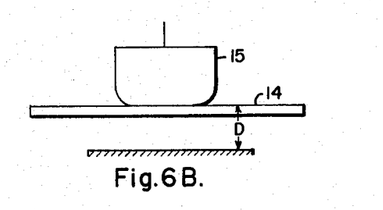
FIG. 6B is a view in elevation of a member similar in shape to the member electrode shown in FIG. 6A but with solid insulation disposed between the member and ground.
Figure 6C:
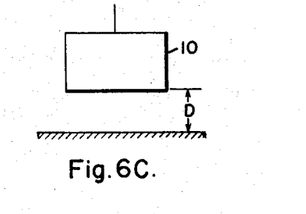
FIG. 6C is a view in elevation of a member with sharp corners, which in a fluoro-carbon vapor dielectric flashes over at low impulse voltages.

Referring now to FIG. 6, the graphs or curves shown were obtained with transformer members, such as illustrated in FIGS. 6A, 6B and 6C, all subjected to operating conditions general in inductive apparatus such as transformers and in gaseous dielectrics containing fluoro-carbon vapors. The member 10 shown in FIG. 6C has square corners and therefore presents sharp edges, which simulates the layers of conductors or coil discs of a coil stack or winding. Such a member flashes over for much lower positive voltage impulses than one having rounded corners, for example, the member 11 which is similar to a winding provided with curve static plates to be described hereinafter and, as shown in FIG. 6A, for corresponding gaps between the members 10 and 11 and ground. The voltage impulses that cause flashover from member 11 of FIG. 6A to ground is about twice the magnitude of the voltage impulses that cause flashovers from member 10 illustrated in FIG. 6C to ground as shown by curves 12 and 13, respectively.

When a solid insulation barrier 14 is placed between the member or electrode 15 with rounded corners and ground, as shown in FIG. 6B, and voltage impulses are applied, flashover occurs at the positive voltage impulses shown by curve 16 of FIG. 6, that is, at values much lower than the values of positive impulses that caused flashovers from electrode 11 to ground in the arrangement shown in FIG. 6A for corresponding gaps between the electrodes and ground. Further, it has been found that the extending of solid insulation barriers, such as 14 shown in FIG. 6B, a substantial distance beyond the ends of the electrode 15 such as windings and core legs does not improve or raise the flashover values for the gaps corresponding to those for which curve 16 was plotted. Therefore, solid insulation barriers should not be employed between members such as high and low voltage windings or between high and low voltage windings and ground, in inductive apparatus utilizing fluorine-containing gaseous dielectrics.

Figure 8:
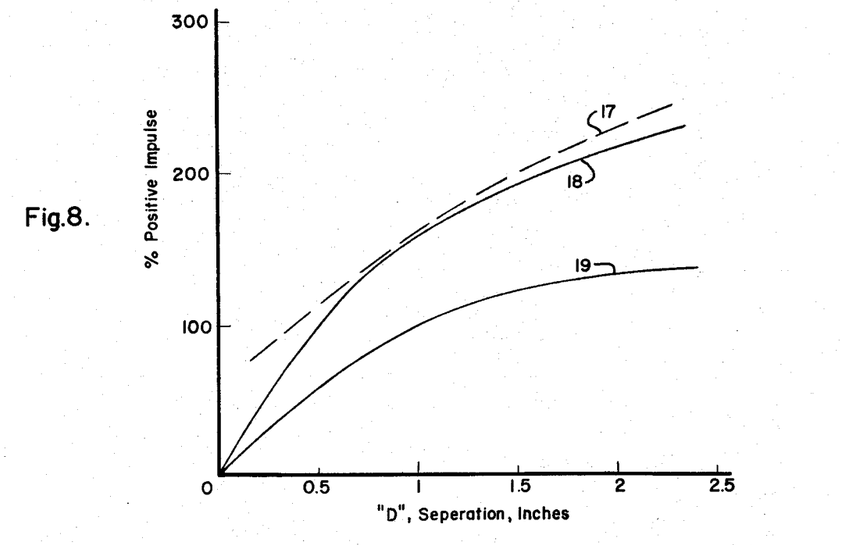
FIG. 8 is a set of graphs showing the impulse voltages at which flashover occurs when members such as those illustrated in FIGS. 6A, 6B and 6C are subjected to flashover impulse voltages in air.

Tests show that the characteristic detrimental effect of solid insulation barriers located between windings or windings and ground, that is, of lowering the impulse voltages that cause flashover in gaseous dielectrics containing fluoro-carbon gases, illustrated by the data recorded in the curves of FIG. 6, is not present when corresponding tests are made in air. In order to substantiate the foregoing statement, tests were made corresponding to those described hereinbefore and with members illustrated in FIGS. 6A, 6B and 6C, but in air instead of in the gaseous dielectric containing fluoro-carbon gases. Referring to FIG. 8, the data obtained from the tests made in air were plotted as the curves 18, 17 and 19, which correspond to the members shown in FIGS. 6A, 6B and 6C, respectively. It is apparent from the tests made in air that in this case, the effect of the solid insulating barrier, as shown by the curve 17, is to improve slightly the flashover from rounded surfaces, as shown by the curve 18, and considerably improve the flashover from the electrode 10 of FIG. 6C having square corners, as shown by the curve 19. Thus, the curve 17 shows a substantial improvement over curve 16 of FIG. 6. The curves 18 and 19 of FIG. 8 are comparable with curves 12 and 13 of FIG. 6. It will be noted that on the curves of FIGS. 6 and 8, the ordinate scale is given as a relative value expressed in percent, using as 100% the voltage which causes a flashover across a one inch gap from member 10 of FIG. 6C in the gas under investigation.

Figure 7:
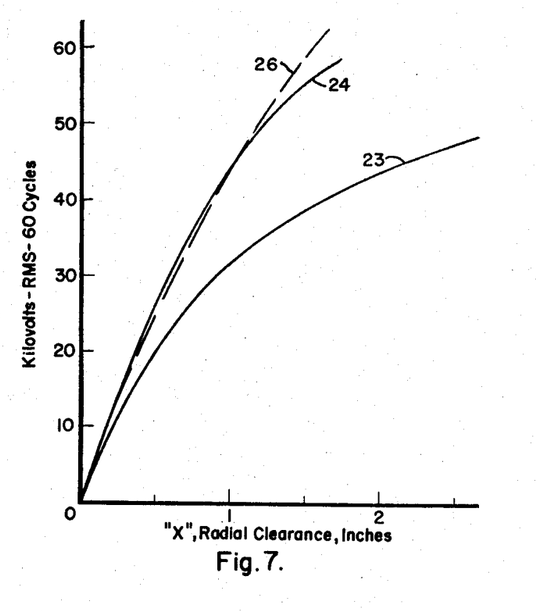
FIG. 7 is a set of graphs showing the 60-cycle voltages which cause flashover across gas at different widths, some members having corners or edges, and others provided with static plates having rounded sides and edges.
Figure 7A:
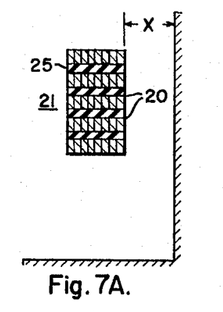
FIG. 7A is an elevational view of coil stacks having sharp corners.
Figure 9A:
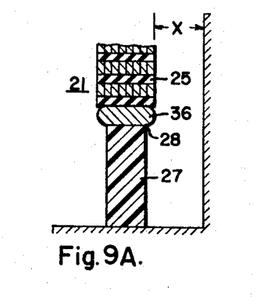
FIG. 9A is a view in section showing a pressure collar slightly less in width than the static plate supporting a coil stack.

In building transformers in accordance with the teachings of this invention, it will be observed by reference to FIGS. 7A and 9A that each coil disc or layer of the high voltage windings 21 presents two corners, upper and lower, on its outside and inside faces. Thus, it would appear that the low flashover impulse voltage values associated with the shape of the electrode 10 of FIG. 6C would apply to each of the coil discs of a high voltage coil stack as shown in FIG. 7A. However, tests show that this is not the case. Investigation reveals that the value of the flashover voltage associated with all intermediate corners 20, FIG. 7A, is high due to the proximity of the neighboring coil discs or layers of conductors of the windings shown generally at 21. Tests also reveal that only the top and bottom corners of the top and bottom coil discs or layers of conductors of the windings 21 of FIG. 7A flash over in response to low impulse voltages. These coil discs or layers of conductors of windings 21 correspond in shape to member 10 of FIG. 6.

Figures 7B, 7C:
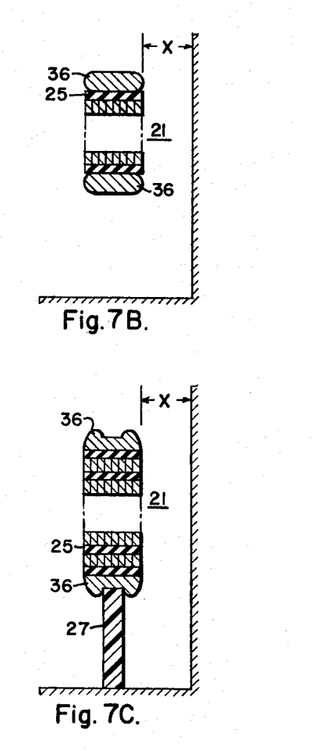
FIG. 7B is a view in elevation of a coil stack provided with pressure plates having rounded corners.
FIG. 7C is a view in elevation of a coil stack showing static plates applied to opposite ends and supported by a pressure collar.

Investigations further reveal that the flashover voltage from the high voltage winding stacks is substantially improved if the stack is terminated at the top and bottom by static rings or plates 36 having rounded edges as shown in FIGS. 7B and 7C which replaces the sharp corners similar to FIG. 7A and raises the resistance to flashover due to impulse voltages. The flashover data obtained with a coil stack such as shown in FIGS. 7A, 7B and 7C is shown by curves 23, 24 and 26, respectively, when tested in air and using an alternating current voltage. The graphs of FIG. 7 disclose the beneficial results of applying the static plates or rings 36 to the opposite ends of the windings or coil stacks. In practice, the radii of the curved on rounded edges of the static plates 36 should be made as large as possible and will depend to some extent on the size of the transformer. For example, graph 24 shown in FIG. 7 was obtained for an edge radius of one-half inch on a static plate 36.

It has also been discovered that when using gaseous dielectrics containing fluorine that the radial spacers 25 should not extend radially beyond the layers of conductors of windings 21. Tests were made to ascertain how the extending of the spacers beyond the layers of the windings would affect the flashover voltage between the windings. When the spacers 25 protruded one-fourth inch beyond the inside periphery of the high voltage coil 21 toward the low voltage coil 34, the result that followed was a reduction of approximately 20 percent and over in the impulse voltages which caused flashover as compared to spacers 25 which terminated flush with the edges of the high voltage winding 21, both tests being made in sulfur hexafluoride gas. Comparable results were obtained in using high voltage alternating current in air. Therefore, radial spacers 25 preferably should not extend beyond the inner or the outer cylindrical faces of the windings 21 or 34 when the low voltage windings conform in design to the high voltage windings 21.

Figure 9B:
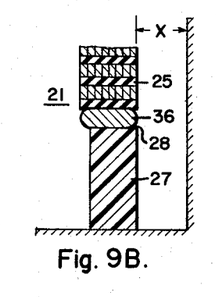
FIG. 9B is a view in section of a pressure collar supporting a static plate and coil stack, the pressure collar being disposed in line with one side of the coil stack.
Figure 9C:
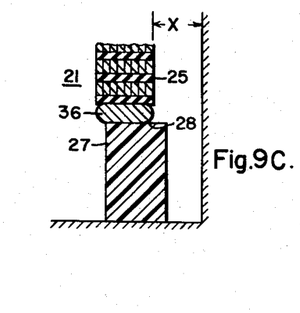
FIG. 9C is a view in section of a pressure collar approximately the width of the static plate, so disposed that the corner of the pressure collar extends beyond the static plate.

With the solid insulation excluded from the radial space between the high and low voltage windings or between the windings and ground, the necessary mechanical supports for the windings are provided at the top and bottom ends of the winding in the form of the pressure collars 27 to be described hereinafter. It was found by tests that the form and position of this supporting collar with respect to the static ring 36 greatly affect the flashover voltage. For example, the effect is illustrated by arrangements shown in FIGS. 9A, 9B and 9C which represent a seemingly slight variation of the supporting collar arrangement, the difference being at point 28, FIGS. 9A to 9D, inclusive. It will be noted that FIGS. 9B and 9C show various degrees of lateral displacement of the supporting collar surface in the radial direction across the static plate 36 and the high-low insulating gas space beyond the area of the contact between the collar and the static plate, whereas in FIG. 9A, no such lateral displacement occurs. Tests show that a high flashover value is secured for the arrangement shown in FIG. 9D and progressively lower values for arrangements shown in FIGS. 9A, 9B and 9C as tabulated below for alternating current voltage tests in air. Similar results may be expected in fluorine-containing gases. The radius of the curvature of the static plate in FIG. 9D is equal to its height.

*Flashover Voltage*

Figure 9D:
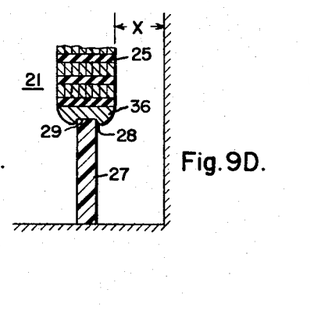
FIG. 9D is a view in section of the preferred embodiment of pressure collar and static plates supporting a coil stack.

|  | X=1″ | X=2″ |
|---|---|---|
|  | Kv. | Kv. |
| Fig. 9A | 40 | 59 |
| Fig. 9B | 35 | 50 |
| Fig. 9C | 28 | 36 |
| Fig. 9D | 43 | 70 |

It is apparent from the foregoing data that any lateral displacement or extension of the supporting pressure collar surface radially beyond the area of contact with static plates such as 28 is detrimental to the resistance to flashover, and should not be used. Furthermore, the high flashover values of FIG. 9D in the above tabulation shows that the shape of the cross section of the static plate may be modified to advantage by flattening the surface facing the bottom layer of windings 21, thereby permitting a large radius, as shown in FIG. 9D, of the surface facing outwardly and sideways from the coil windings 21.

The static plate surface facing axially away from the stack of coils 21 may be grooved as at 29 to receive the pressure collar 27 as shown in FIG. 9D. This grooving will effect an improved anchoring of the pressure collar 27 in the static plate 36. In order to improve the mechanical and electrical characteristics of the static plate and pressure collar combination, the groove 29 in FIG. 9D between the two members may be filled with a bonding and insulating compound, many of which are known to those skilled in the art.

It now has been shown that in the building of inductive apparatus which uses gaseous dielectrics, particularly gaseous dielectrics containing fluorine, that solid insulation between the high and low voltage windings and between the windings and ground is detrimental. It is well known that solid insulation is part of the supporting structure in many types of inductive apparatus. Therefore, when the solid insulation for some purposes is discontinued the whole structure has to be recreated to associate the essential members or parts to perform the functions required. Further, the pressure collars 27, static plates 36, spacers 25 and many other parts that will be described hereinafter will have to be supplied and associated with one another in the light of the information given to provide a satisfactory inductive device for utilizing a gaseous dielectric particularly when it contains fluorine.

Figure 1:
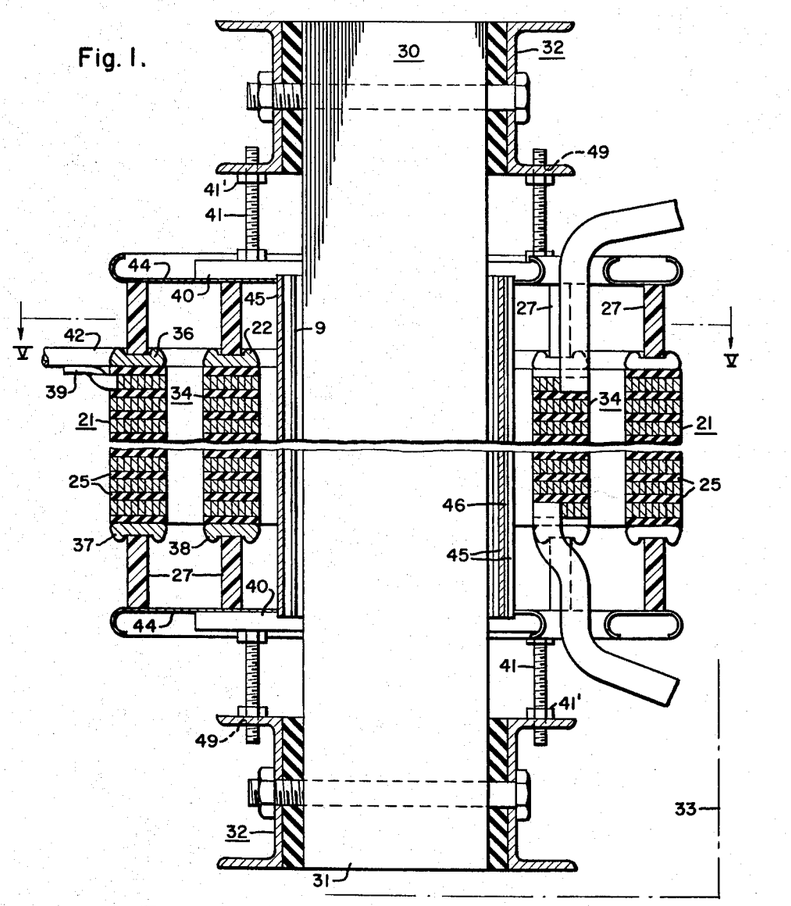
FIGURE 1 is a view partly in section and partly in side elevation of a transformer embodying the features of the invention.
Figure 2:
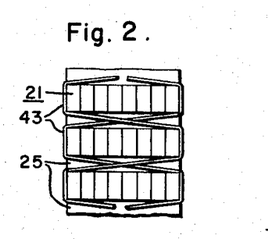
FIG. 2 is a view in side elevation of a part of a transformer coil stack showing means for preventing lateral movements of the coil sections relative to one another.
Figure 3:
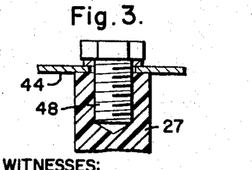
FIG. 3 is a view partly in section and partly in side elevation showing details of how an end shield is connected to a pressure collar.

Referring now to FIGS. 1 to 3 inclusive, a transformer suitable for using sulfur hexafluoride and electrically insulating fluorinated compounds such as disclosed in Patent 2,561,738 referred to hereinbefore comprises a transformer core shown generally at 30 provided with a plurality of core legs 31 bolted to a frame shown generally at 32 and mounted on suitable supporting members in a transformer case 33. The high voltage windings or coils 21 consist of a plurality of disc-shaped coils or conductor layers connected in series-circuit relationship and separated by radial insulation spacers 25. The radial lengths of spacers 25 are substantially equal to the radial length of the coils or windings 21, whereby the circumferential edges of the spacers are substantially in line with the inside and outside cylindrical boundaries or surfaces of the high voltage and low voltage windings 21 and 34.

The top member of the stack of coils 21 of the high voltage winding carries a static plate or ring 36. In view of the function to be performed, the static ring 36 will be made of a material which has good electrical conducting capacity at least on its surface and mechanical strength to give adequate support to the windings. Metals such as steel or aluminum have been utilized with good success. In order to prevent the circulation of eddy currents in the static plate or ring 36, it will be provided with a radially extending slit or gap 35, best shown in FIG. 5. The other static plates or rings 37, 22 and 38 for supporting the high and low voltage windings 21 and 34 will be made in the same manner, all having slits or gaps for preventing the circulation of eddy currents.

Figure 4:
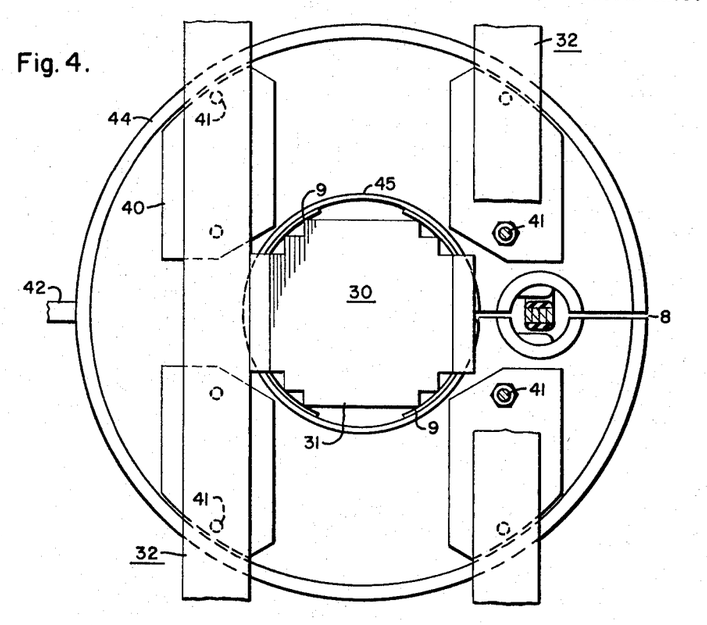
FIG. 4 is a view in top elevation of a transformer illustrated in FIG. 1.

It has been found that when the slit or gap 8 in the end shield 44 is about one-sixteenth of an inch to one-eighth of an inch in width, very satisfactory functioning of the structure results. This reduces the concentration of stresses. As shown in FIG. 4, an opening is provided in the end shield 44 for bringing out the low voltage leads.

Generally, the surfaces of the rings 22 and 36 to 38, inclusive, facing outwardly and away from the high and low voltage coils, will be suitably rounded to as large a radius as posible to avoid sharp corners and edges to avoid high electrical stress concentrations. Further, the static ring 36 is electrically connected to the upper lead 39 of the high voltage coil as shown in FIG. 1 and to a common lead 42, which will be preferably of circular cross section.

If the high voltage winding is to be fully insulated at both ends, the lower end of the winding is also provided with or supported on the static ring 37 referred to hereinbefore. Likewise, static rings 22 and 38 will be connected to the upper and lower leads of the low voltage coil respectively.

It has been common practice in building transformers to employ insulating barriers in the space between the high and the low voltage windings, the barrier serving as a mechanical support for the high voltage windings. Further, as is well known, when barriers of solid insulation are employed with dielectrics such as oil, they greatly increase the resistance to flashover between the windings. It has now been discovered that particularly when fluorine-containing gases are employed as dielectrics, the presence of the solid insulation barrier is highly detrimental. Therefore, when a gaseous dielectric containing fluorine is to be employed, no solid insulation barrier will be utilized between the high and low voltage windings. When solid insulation barriers are dispensed with, other means must be provided to support the high voltage and low voltage windings.

In this embodiment of the invention, the high voltage and low voltage windings are supported by pressure collars 27 made from a suitable insulating material. The pressure collars, in turn, are supported by pressure plates 40 and pressure bolts 41, the latter being suitably disposed in the steel frame 32. Pressure collars 27 may be constructed from any suitable, mechanically strong insulating material, such as bonded pressboard, bonded paper, or an organic or silicone resin reinforced with fibre glass.

In order to prevent horizontal displacement of coil discs 21, spacers 25 and the static rings 22 and 36 to 38 with respect to one another when subjected to lateral stresses such as occur in shipping and in use, several methods have been found practical. One method that has been found successful is to apply a suitable resinous bond between the contacting surfaces of the coil discs 21 and spacers 25 and static rings 22 and 36 to 38 of the coil stack. Suitable resinous bonds are known to those skilled in the art.

Another method of accomplishing the same results is to use, in conjunction with the spacers 25, tension cords or tapes 43 (shown in FIG. 2) interlaced in criss-cross arrangement with the winding or coil discs 21 and 34. Further, the tapes 43 will be spaced angularly around the circumference of the coil discs. The reinforcing tape or cord may be made of a resinous material reinforced with glass fibre. This material has very high tensile strength and is known in the art.

Other methods of preventing lateral relative movements of the members of the stack are known and those described hereinbefore are given only by way of illustration. The method employed will give the required mechanical strength without introducing solid insulation materials in major clearances or spaces between windings or between windings and ground, which will be filled with the gaseous dielectric.

The low voltage winding 34 will be of a design similar to high voltage windings, which has been described hereinbefore and illustrated in FIG. 1, if the low voltage winding rating is high enough to require this type of structure. However, for the lower voltage ratings and when other conditions permit, the low voltage winding 34 may be of any conventional design.

Figure 5:
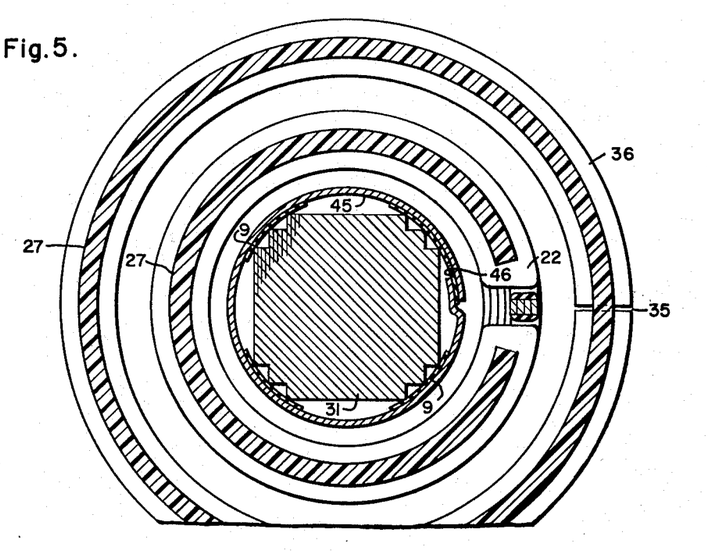
FIG. 5 is a view in section taken along the lines V—V of FIG. 1.

Referring now to FIGS. 1, 4 and 5, it will be observed that the coil stacks are supported by specially designed members as for example, the pressure collars 27, the ground or end shields 44, presure plates 40, and leg shield 45, in cooperation with other members. The members that are in closest proximity to the insulated winding stacks are shaped to present rounded corners and edges which are not subject to high concentrations of electrical stresses. Therefore, they have a high corona level and do not flash over under ordinary impulse voltages.

Core leg shields 45 are provided on the core legs 31. These core leg shields 45 are metallic sheets wrapped around the legs forming a cylinder and having overlapping ends. The overlapping ends have an insulating member 46 disposed between them to prevent the flow of eddy currents. In mounting the core leg shields 45, it has been found to be good practice to insulate them from the core by members 9, and ground them at only one point.

The end shield 44 is an annular plate curved upwardly at the outer periphery. The inner edge of the shield 44 engages the core leg shield 45 as best shown in FIG. 1. In some instances, the end shield 44 engages the core leg 31. In either case, the end shield 44 is so disposed that it will serve to improve the flashover voltage from the windings to ground and to provide a mechanical centering means for the windings 21 and 34. A slit or gap 8, as shown in FIG. 4, will be provided in the end shields 44 to prevent circulation of eddy currents.

When the end shields 44 are employed for centering the windings 21 and 34, they are disposed in engagement with the core legs and rest on the pressure collars 27 separating them from the pressure plates 40. One way to effect engagement of the end shields 44 and collars 27 is to provide holes in the end shields 44 disposed in alignment with threaded openings 47 in the pressure collars 27 as best shown in FIG. 3. Screw bolts 48 are provided for connecting the pressure collars 27 to the end shields 44. The screw bolts 48 will preferably be made of electrically insulating material. The number of screw bolts employed will depend on the conditions to be met. The method described hereinbefore of attaching the end shield 44 to the pressure collar 27 is merely by way of example. Other methods, which do not introduce electrical stress concentration and which are well known to those skilled in this art, may be employed.

As illustrated, the structure described hereinbefore is disposed between pressure bolts 41 carried by the channel members 32 of the opposite ends of the same structure. These bolts may be mounted in any suitable manner. In this embodiment of the invention, for purposes of illustration only, the bolts 41 are mounted in threaded engagement in threaded openings 49 in the channel members 32 and are shown as having square or hexagonal heads to facilitate adjustment in the channel members 32 to apply pressure to the pressure plates 40. Nuts 41' are provided on the bolts 41 to provide for locking them in any predetermined position to which they have been adjusted to apply pressures to the pressure plates 40. In this manner, the high voltage windings may be supported in any predetermined position between the channel members of the transformer framework.

Figure 10:
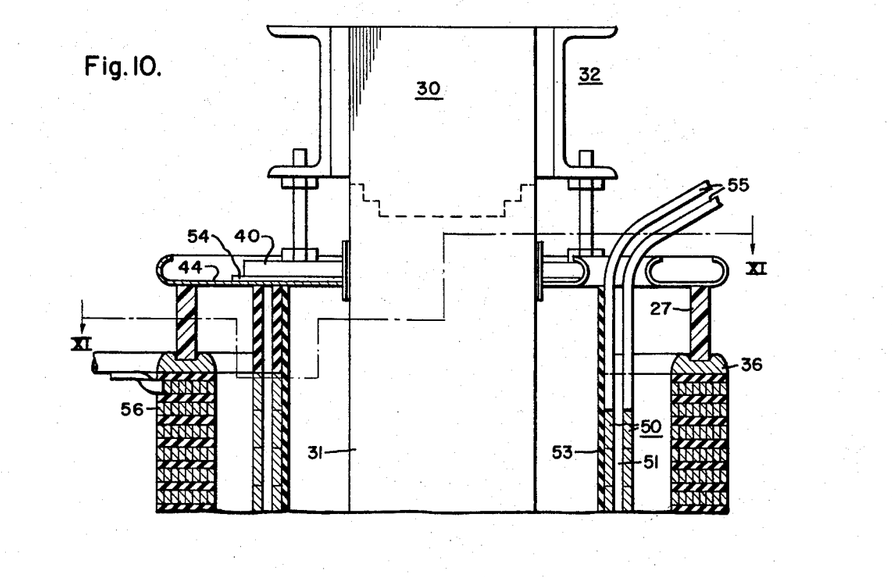
FIG. 10 is a view in vertical section taken along the line X—X of FIG. 11 showing details of the sturcture.
Figure 11:
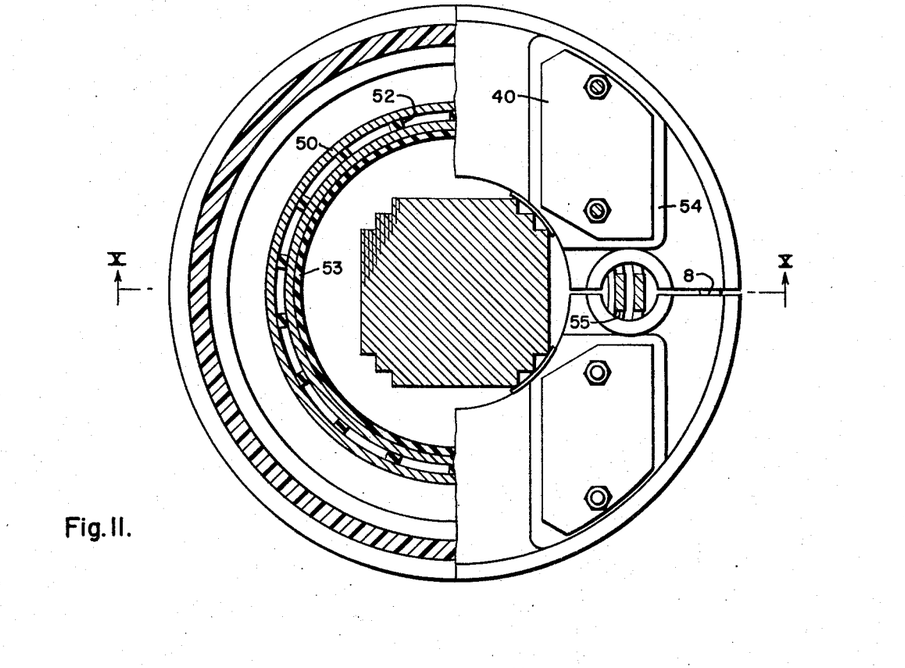
FIG. 11 is a view in horizontal section taken along the line XI—XI of FIG. 10 showing the relative positions of the windings.

In some instances it is desirable to build and mount the high voltage windings or coils 21 in the manner described hereinbefore, while the low voltage windings shown generally at 50 in FIGS. 10 and 11 are standard construction. As shown in FIGS. 10 and 11, the low voltage windings 50 are made up of a plurality of substantially cylindrical windings spaced from one another as shown at 51. The proper spacing is maintained by the use of spacer members 52 made from some suitable insulating material and best shown in FIG. 11. The low voltage windings 50 are supported on the core 30 by the barrier 53 made of some well-known insulating material. This is common practice in building transformers and being well known in the art, need not be described in detail.

The only change made in supporting the low voltage coils 50 involves the extending of the end shields 44 inwardly to the core 30 above and below the low voltage coils. When the low voltage coils are supported at their ends in this manner, the pressure plates 40 may be utilized in cooperation with the end shields 44 for centering both the high voltage and low voltage windings. The pressure plates 40 will be insulated from the end shields 44 by insulating members or sheets 54.

Provisions will be made for bringing out the leads 55 of the low voltage windings through the end shield 44. A suitable method is shown in FIGS. 4 and 5 and described in the specification.

In the embodiments illustrated in FIGS. 10 and 11, concentric windings 50 are disclosed in conjunction with barrier 53 which cooperates in supporting the windings. Instead of this type of low voltage winding structure, any well-known conventional low voltage winding may be utilized with the high voltage winding described hereinbefore.

While no definite rule can be stated as to when a conventional low voltage winding should be used in conjunction with this new type of high voltage structure, it may be said generally that the conventional type of low voltage winding will be employed when the voltage ratings are low. In fact, if the voltage ratings are low enough, the barrier 53 mounted on the leg of the core may be dispensed with. The expense involved in providing the barrier 53 is only justified with medium voltage ratings. It is only when the voltage ratings of the high voltage windings 56 reach a certain value that the manufacturer will be warranted in the added expense involved in constructing and mounting the low voltage windings in the manner described hereinbefore.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim as my invention:

1. A transformer comprising a case, a core having a plurality of legs, high voltage and low voltage windings mounted in concentric relation with and spaced apart from one another on the legs of the core, a gaseous dielectric only disposed between said windings to prevent a voltage breakdown between said windings due to the voltage difference between said windings, each winding comprising a plurality of layers of conductors, layers of solid insulation disposed between the layers of conductors, the layers of solid insulation being so constructed that they do not extend laterally beyond the layers of conductors, static plates applied to the opposite ends of the high voltage and low voltage windings, the surfaces of the static plates not in engagement with the windings being curved to prevent the concentration of electrical stresses, and a supporting member formed from electrically insulating material disposed at each end of said high voltage winding to bear against each of said static plates for supporting the static plates, windings, and layers of solid insulation in predetermined positions on the core legs, the radial dimension of each of said supporting members being substantially limited to the area of contact with the associated static plate.

2. A transformer comprising a case, a core having a plurality of legs, a cylindrical metallic leg shield mounted on the core leg, high voltage and low voltage windings mounted on the leg of the core outside the cylindrical metallic leg shield, the high voltage windings comprising layers of conductors wound upon one another, an electronegative gaseous dielectric only disposed between said windings, layers of solid insulation being so constructed that they do not extend beyond the layers of the conductors, static plates applied to the opposite end of high voltage and low voltage windings, the surfaces of the static plates not in engagement with the windings being curved to prevent the concentration of electrical stresses, insulating pressure collars applied to the static plates, end shields applied to the insulating pressure collars, the inner edges of the end shield engaging the core, and means for fastening the end shield to the pressure collars to fix them in position relative to the core pressure plates carried by the end shield, and means cooperative with the pressure plates to support the static plates, layers of conductors and solid insulation in predetermined positions on the legs of the core.

3. A transformer comprising a casing, a core having a plurality of legs, a cylindrical metallic leg shield mounted on the core, insulation disposed in the cylindrical metallic leg shield to prevent the flow of eddy currents, high voltage and low voltage windings mounted on a leg of the core outside the cylindrical metallic leg shield, a gaseous dielectric only disposed between said windings, the high voltage and low voltage windings comprising layers of conductors wound upon one another, layers of solid insulation disposed between the layers of conductors, the layers of the solid insulation being so constructed that they do not extend beyond the layers of conductors, static plates applied to opposite ends of high voltage and low voltage windings, the surfaces of the static plates not in engagement with the windings being curved to prevent the concentration of electrical stresses, pressure collars of insulating material applied to the static plates, end shields applied to the insulating collars, pressure plates carried by the end shields, means cooperative with the pressure plates to support the static plates, layers of conductors and solid insulation in predetermined positions on the leg of the core, the inner end of the end shields engaging the core leg.

4. A transformer comprising a case, a core having a plurality of legs, high voltage and low voltage windings mounted on the legs of the core in substantially concentric relation with and spaced apart from one another, an electronegative gaseous dielectric only disposed between said windings, said dielectric comprising the vapors of a fluoro-carbon compound to prevent a voltage breakdown between said windings due to the voltage difference between said windings, each winding comprising a plurality of layers of conductors, layers of solid insulation disposed between the layers of conductors, the layers of solid insulation being so constructed that they do not extend laterally beyond the layers of conductors, static plates applied to the opposite ends of the high voltage winding, the surfaces of the static plates not in engagement with the winding being curved to prevent the concentration of electrical stresses, insulating members for supporting the static plates, windings, and layers of solid insulation in predetermined positions on the core legs, said insulating members being disposed around the periphery of said windings, and end shielding means disposed adjacent to the portion of the insulating member at one end of said high voltage windings which is axially away from the associated static plate.

5. A transformer comprising a case, a core having a plurality of legs, a cylindrical metallic leg shield mounted on the core, high voltage and low voltage windings mounted on the leg of the core outside the cylindrical metallic leg shield, an electronegative gaseous dielectric only disposed between said windings, the high voltage and low voltage windings comprising layers of conductors wound upon one another, layers of solid insulation disposed between the layers of conductors, the layers of solid insulation being so constructed that they do not extend beyond the layers of conductors, static plates applied to opposite ends of the high voltage and low voltage windings, pressure collars of the insulating material applied to the static plates, end shields applied to the pressure collars, the end shields having their outer peripheries curved and their inner edges in engagement with the cylindrical metallic leg shields to prevent the concentration of electrical stresses, pressure plates carried by the end shields, and means cooperative with the pressure plates to support the static plates, layers of conductors and solid insulators in predetermined positions.

6. A transformer comprising a case, a core having a plurality of legs, a low voltage winding mounted on the core, a high voltage winding disposed in cooperative relationship with the low voltage winding, a gaseous dielectric only disposed between said windings, the high voltage winding comprising layers of conductors, layers of solid insulation being so constructed and disposed that they do not extend beyond the layers of conductors of the high voltage winding, static plates applied to the opposite ends of the high voltage winding, the surface of the static plates not in engagement with the windings being curved to prevent the concentration of electrical stresses, insulating pressure collars applied to the static plates, resinous bonding means for securing said collars to said static plates, end shields applied to the insulating pressure collars, the inner edges of the end shield engaging the core, means for fastening the end shield to the pressure collars, and means cooperative with the pressure plates to support the static plates, layers of conductors and solid insulation in predetermined positions on the legs of the core.

7. A transformer comprising a generally cylindrical high voltage winding, a low voltage winding disposed in substantially concentric relation with and spaced apart from said high voltage winding, and an electronegative gaseous dielectric only disposed between said windings to prevent a voltage breakdown between said windings due to the voltage difference between said windings, a generally ring-shaped shielding member disposed adjacent to at least one end of said high voltage winding, insulating members disposed at each end of said high voltage winding around the periphery thereof, said shielding member having surfaces not in contact with the high voltage winding curved to prevent the concentration of electrical stresses and a portion intermediate the surface of said shielding member away from the high voltage winding adapted to receive one of said insulating members, and means for applying pressure to said insulating members to maintain said windings in predetermined positions.

8. A transformer comprising a generally cylindrical high voltage winding, a low voltage winding disposed in substantially concentric relation with and spaced apart from said high voltage winding, an electronegative gaseous dielectric only disposed between said windings, a generally ring-shaped shielding member disposed on at least one end of said high voltage winding, insulating collars disposed at each end of said high voltage winding for supporting the latter winding, said shielding member having surfaces not in contact with the high voltage winding curved to prevent the concentration of electrical stresses and a groove intermediate the surface of said member away from said high voltage winding adapted to receive one of said collars, and means for applying pressure to said collars to maintain said windings in predetermined positions.

9. A transformer comprising a generally cylindrical high voltage winding, said high voltage winding including a plurality of stacked disc-type coils, a plurality of radial insulating spacers disposed between said coils, the radial length of said spacers being substantially equal to the radial dimensions of said coils, a low voltage winding disposed in substantially concentric relation with and spaced apart from said high voltage winding a generally ring-shaped shielding member disposed adjacent to at least one end of said high voltage winding, insulating members disposed at each end of said high voltage winding for supporting the latter winding, said shielding member having surfaces not in contact with the high winding curved to reduce the concentration of electrical stresses, and an electronegative gaseous dielectric only disposed between said windings, said gaseous dielectric comprising one or more fluorine-containing gases to prevent a voltage breakdown between said windings due to the voltage difference between said windings.

References Cited in the file of this patent

UNITED STATES PATENTS

| | | |
|---|---|---|
| 1,368,811 | Kurda | Feb. 15, 1921 |
| 1,600,963 | Brand | Sept. 21, 1926 |
| 2,295,415 | Monroe | Sept. 8, 1942 |
| 2,318,068 | Elsner | May 4, 1943 |
| 2,561,738 | Hill | July 24, 1951 |
| 2,668,911 | Schlesinger | Feb. 9, 1954 |

FOREIGN PATENTS

| | | |
|---|---|---|
| 225,860 | Switzerland | June 1, 1943 |
| 388,355 | Germany | June 12, 1924 |
| 405,441 | Germany | Nov. 5, 1924 |